Aug. 30, 1955  P. E. LOWE ET AL  2,716,530
SUPPORT FOR A TUBE CUTTING DEVICE
Filed April 17, 1952  2 Sheets-Sheet 1

INVENTORS
Henry J. Bellarts
Paul E. Lowe
BY
Roland A. Anderson
Attorney

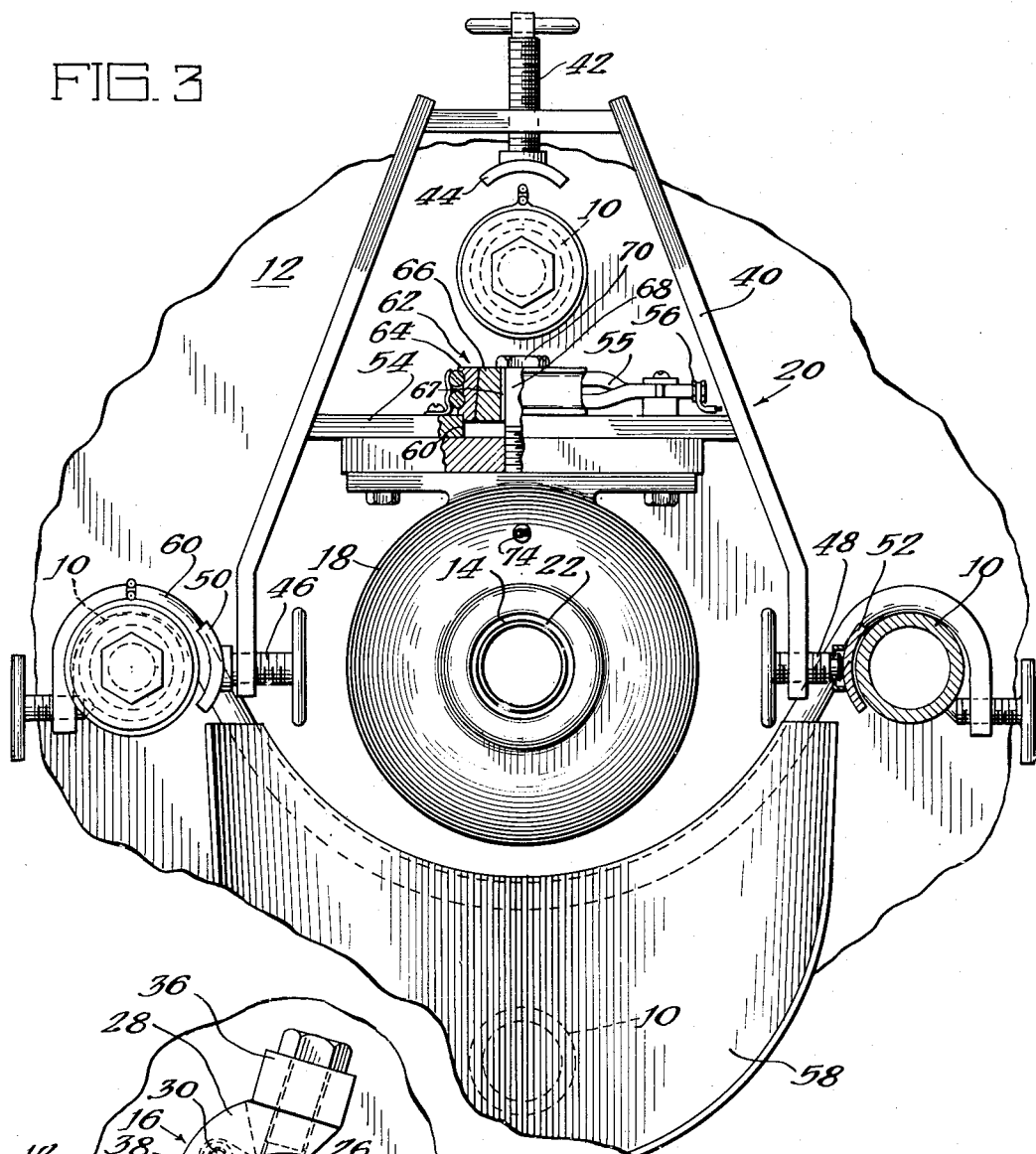

United States Patent Office 2,716,530
Patented Aug. 30, 1955

2,716,530

SUPPORT FOR A TUBE CUTTING DEVICE

Paul E. Lowe and Henry J. Bellarts, Richland, Wash., assignors to the United States of America as represented by the United States Atomic Energy Commission Application April 17, 1952, Serial No. 282,786

1 Claim. (Cl. 248—14)

The present invention relates generally to supporting apparatus, and more particularly supporting apparatus for pipe cutting devices.

It is occasionally necessary to sever a tube in a location unfit for human occupancy, such as within a boiler or other device where temperature or other conditions present a health hazard. It may not be possible to remove the tube from the device in which it is used due to space considerations, or other reasons, thus making it desirable to sever the tube by means of a remotely operated pipe cutting device.

It is an object of the present invention to provide a support for a cutting device which may be readily positioned by remotely operated means and controlled at a remote location.

It is a further object of the present invention to provide a support for a cutting device which requires no feed adjustments and operates automatically once it is put into operation.

Other objects and advantages of the present invention will become apparent from a further reading of the specification and claims, particularly when viewed in the light of the drawings, in which:

Figure 3 is an end elevational view of the device shown in Figure 1 partly cut away and in section; and Figure 4 is a sectional view taken along line 4—4 of Figure 2.

Figure 1:
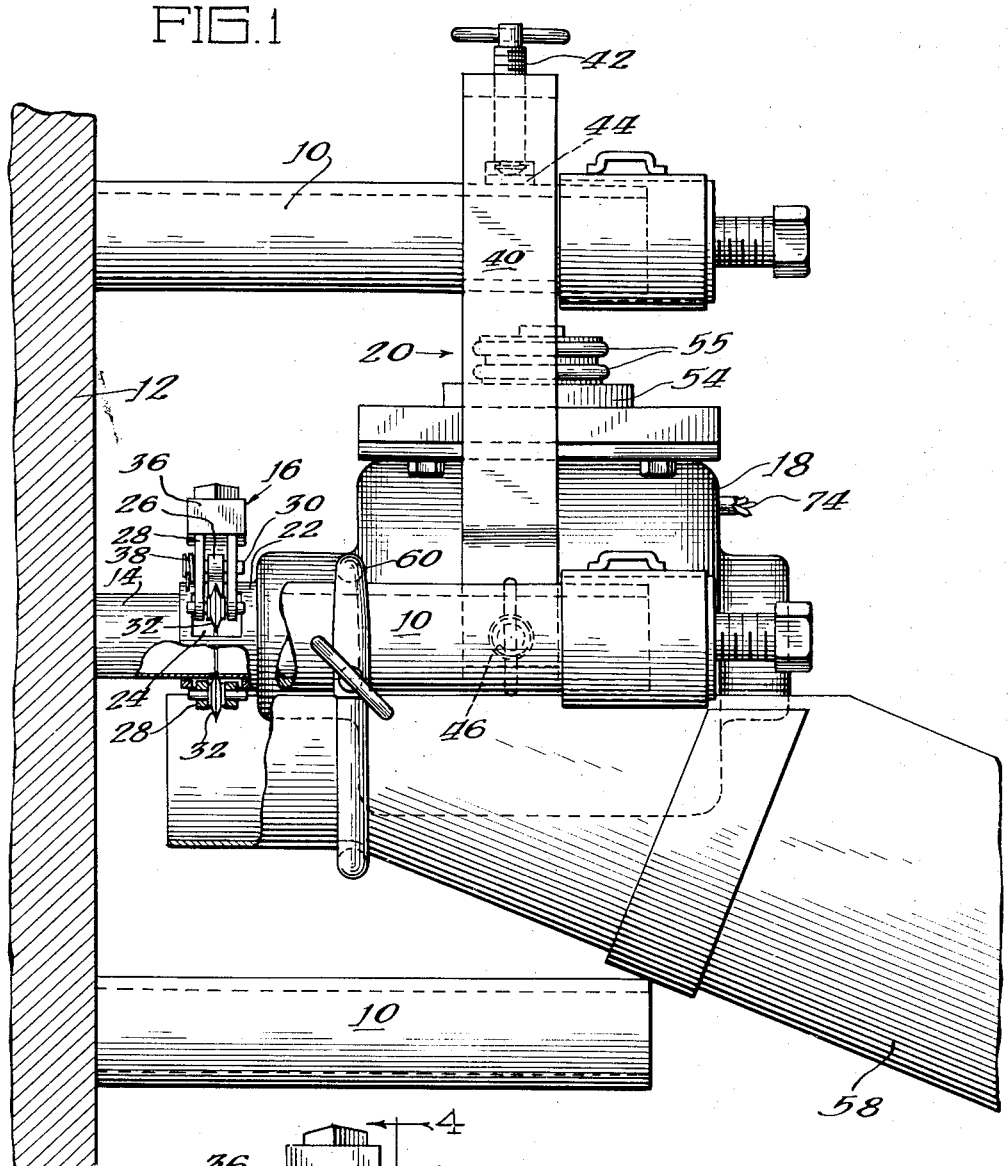
Figure 1 is a side elevational view, partly cut away and in section, of a pipe cutting device embodying the present invention mounted in position to sever a tube.
Figure 2:
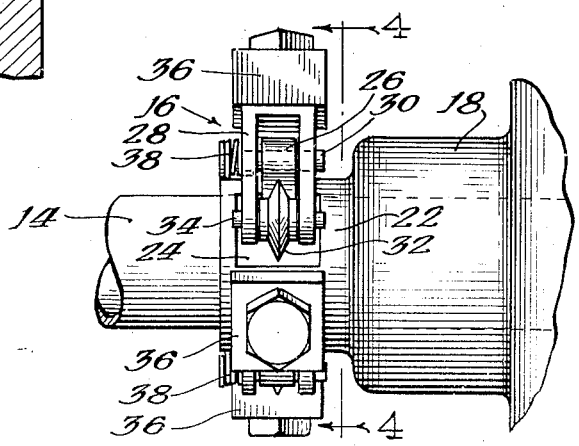
Figure 2 is an enlarged side elevational view of a portion of the cutting device shown in Figure 1.

The cutting device has been illustrated mounted upon tubes 10 which traverse a wall 12. The tubes 10 may be protruding from a permanently constructed device, such as a boiler, or may simply be a portion of a jig used to hold a tube 14 which is to be severed.

The cutting device consists of a cutting head 16 and a motor 18 to drive the cutting head 16, and is carried on the pipes 10 by a novel mounting or supporting means 20 of the present invention.

The motor 18 is a conventional electric motor having a hollow sleeve 22 extending therethrough in place of the conventional solid shaft. The sleeve 22 has a diameter sufficiently large to accommodate the tube 14 which is to be cut. A number of apertures 24 are provided near the one end of the sleeve 22, the apertures 24 being equally spaced around the sleeve 22. A protruding pivot support 26 is attached to the sleeve 22 between each pair of apertures 24, as by welding for example. A U-shaped pivot arm 28 is mounted pivotally on each of the pivot supports 26 by pins 30 which are disposed through the pivot supports 26 and the pivot arms 28. The open end of each of the U-shaped pivot arms 28 supports a cutting disc 32 which is rotatably disposed about a pin 34 which is journaled within the open ends of one of the pivot arms 28. The closed end of each of the U-shaped pivot arms 28 is provided with a weight 36 of greater weight than the cutting discs 32. A spiral spring 38 is disposed about each of the pins 30 which pivotally attach the pivot arms 28 to the pivot supports 26 and the ends of each of the spiral springs 38 contacts its respective pivot arm 28 and the sleeve 22 in order to bias the disc cutters 32 away from the sleeve 22. Three disc cutters 32 are shown in the drawings, but any number of cutters may be used.

The supporting means 20 has a yoke 40 constructed of strong materials, such as steel. A screw 42 is threaded through the apex of the yoke 40 and terminates beneath the apex in a seat 44 which is adjustable relative to the apex of the yoke 40 by rotation of the screw 42. Screws 46 and 48 and seats 50 and 52 are also provided at the ends of the yoke 40.

A cross member 54 is attached between the two legs of the yoke 40, as by welding, and is provided with a central aperture 60. A releasable mounting device 62 is mounted on the cross member 54 above the aperture 60. This releasable mounting device 62 includes a circular electrical heating element 64 mounted on the cross member 54 and a tapered plug 66 fitting in a tapered hole in the heating element 64 and soldered thereto. The plug 66 is provided with a central aperture 67. The motor 18 is secured to the plug 66 by a bolt 68 traversing the aperture 67 and having a head 70 resting on the plug 66. Lead wires 55 from the heating element 64 are connected to terminals 56 and are adapted to be connected to a source of electrical energy. The motor 18 may thus be released by connecting the terminals 56 to a source of electrical energy, thus melting the solder securing the plug 66 to the heating element 64 and allowing gravity to pull the plug 66 from the heating element 64.

Electrical leads 74 extend from the motor 18 and are adapted to be connected to a source of electrical energy. A chute 58 is also provided below the motor 18 and the cutting head 16. It is provided with a separate yoke 60 which attaches the chute 58 to the pipes 10.

Since the wall 12 and pipes 10 constitute means for holding the tube 14 which is to be cut, the tube cutter may be mounted upon the pipes 10 and centered about the tube 14 by adjustment of the screws 42, 46 and 48. Because the sleeve 22 of the motor 18 is hollow, the tube 14 may be inserted into or through the motor 18 to any desired position. A source of electrical power may then be connected to the leads 74 for operating the motor 18. Thus positioned, the tube cutter may be actuated or de-actuated by controlling the flow of electric current for the motor 18, and thus may be readily controlled from a remote location.

When the motor is energized causing the sleeve 22 to rotate therein, the cutting head 16 will also rotate. As a result, the centrifugal force generated by the rotation of the cutting head 16 causes the weights 36 of the pivot arms 28 to move radially outward from the sleeve 22, thus forcing the cutting discs 32 through the apertures 24 in the sleeve 22 and into contact with the tube 14 which is to be cut. Further operation of the motor 18 will cause the discs 32 to completely penetrate the tube 14. However, further rotation of the sleeve 22 will not cause the discs to move further toward the axis of rotation, since the pivot arms 28 are effectively stopped by contact with the sleeve 22 at the edge of the apertures 24. In this manner, solid materials within the tube 14 will not be damaged by the cutting process. Also, the use of disc cutters prevents the formation of chips and provides a smooth cut. The chute 58 is provided beneath the cutters for the purpose of carrying away liquids which may be within the tube 14 and which will leak as a result of the cutting thereof.

Although the supporting means has been illustrated as applied to a tube cutter, it will be apparent to the person

What is claimed is:

Apparatus for supporting a rotatable tube cutter and motive means therefor, said apparatus comprising a yoke, adjustable screws at the apex and ends of the yoke, seats connected with the screws and being engageable with tubes above and at opposite sides of the yoke, the seats on the screws at the ends of the yoke facing outwardly away from the yoke, the seat on the screw at the apex of the yoke facing inwardly of the yoke, a cross member secured to the yoke, and means for supporting the motive means on the cross member.

References Cited in the file of this patent

UNITED STATES PATENTS

| | | |
|---|---|---|
| 1,306,588 | France | June 10, 1919 |
| 2,112,396 | Corrigan | Mar. 29, 1938 |
| 2,619,174 | Neale | Nov. 25, 1952 |

FOREIGN PATENTS

| | | |
|---|---|---|
| 36,158 | Denmark | June 28, 1926 |